Sept. 13, 1966 S. B. PRELLWITZ 3,273,058
ELONGATED RELATIVELY THIN METAL CAPACITOR PROBE IN COMBINATION
WITH A CONVEYING MEANS FOR DETERMINING THE DIELECTRIC
PROPERTIES OF BULK MATERIAL
Filed March 23, 1961 2 Sheets-Sheet 1

INVENTOR.
SAMUEL B. PRELLWITZ
BY
Donald G. Dalton
ATTORNEY

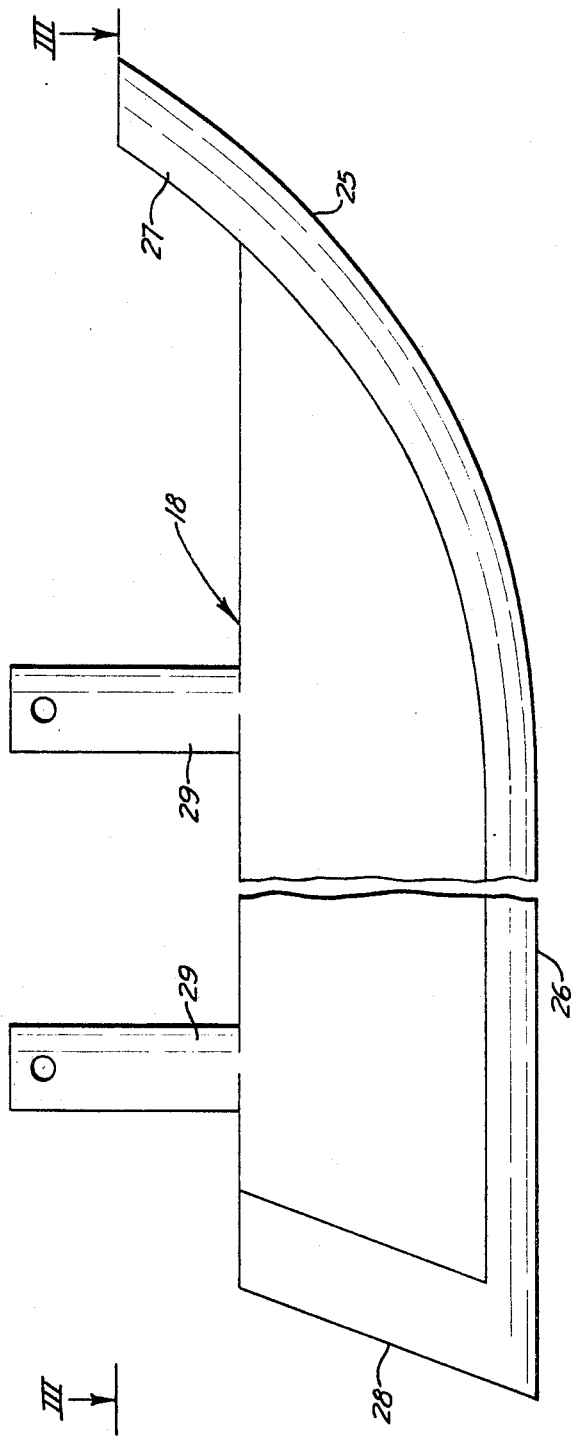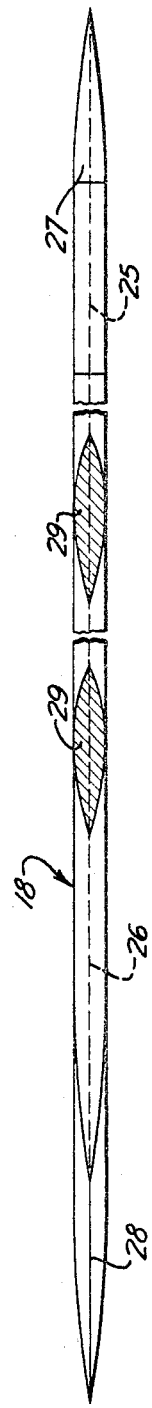

United States Patent Office 3,273,058
Patented Sept. 13, 1966

3,273,058
ELONGATED RELATIVELY THIN METAL CAPACITOR PROBE IN COMBINATION WITH A CONVEYING MEANS FOR DETERMINING THE DIELECTRIC PROPERTIES OF BULK MATERIAL
Samuel B. Prellwitz, Pittsburgh, Pa., assignor to United States Steel Corporation, a corporation of New Jersey
Filed Mar. 23, 1961, Ser. No. 97,857
4 Claims. (Cl. 324—61)

This invention relates to an improved probe for insertion in a stream of relatively moving material.

Although the invention is not thus limited, one application for which my probe is particularly useful is in a dielectric apparatus for measuring and recording the moisture content of bulk material, such as coal. Conventionally this type of apparatus includes a fixed, electrically conductive probe which extends into material carried on a moving conveyor belt, an electrode plate spaced beneath the belt, and a capacitance bridge circuit to which the probe and plate are connected. The dielectric constant of the material, and hence the capacitance of the circuit, vary with the moisture content of the material. The circuit includes a suitable recording meter which measures and records the capacitance in terms of the moisture content. One difficulty encountered in the operation of this apparatus is that foreign bodies in the material, such as pieces of wire or string, lodge against the upstream end of the probe and disturb the dielectric constant. Consequently the meter gives a false reading, which may not be noticed unless it moves outside the expected range. Nevertheless it is apparent my probe may be used elsewhere for overcoming analogous problems.

An object of the present invention is to provide an improved probe which overcomes the foregoing difficulty, that is, which does not catch foreign bodies in material moving relatively thereto.

A more specific object is to provide an improved probe which has smooth contours at its upstream end and also on its supporting tabs, whereby foreign bodies in the material do not lodge thereon but move along with the material.

In accomplishing these and other objects of the invention, I have provided improved details of structure, a preferred form of which is shown in the accompanying drawings, in which:

FIGURE 2 is a side elevational view of the probe; and

FIGURE 3 is a horizontal section on line III—III of FIGURE 2.

Figure 1:
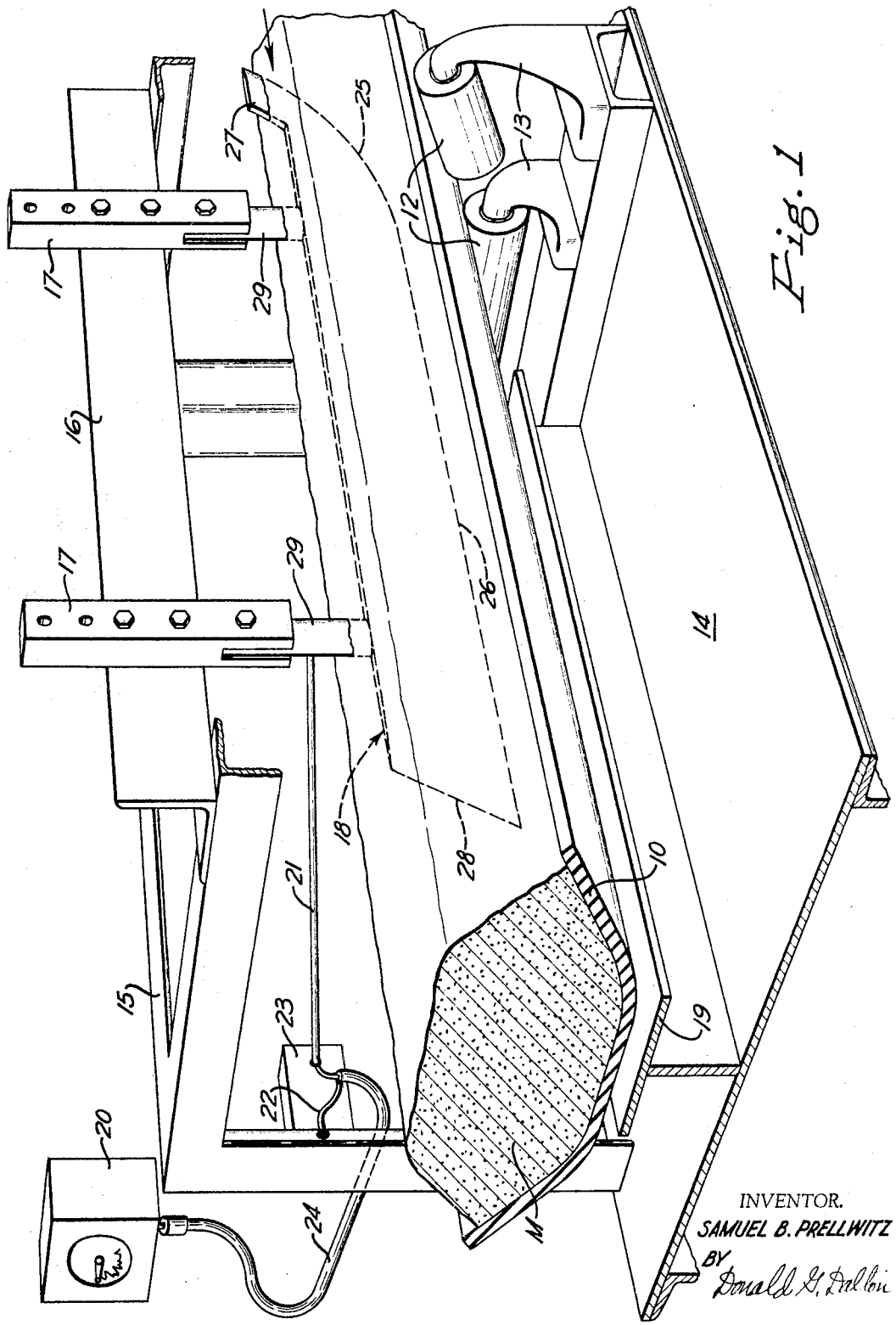
FIGURE 1 is a diagrammatic perspective view with parts broken away showing a moisture recording apparatus equipped with my improved probe.

FIGURE 1 shows a conveyor belt 10 which carries bulk material M, for example coal. The belt runs over idler rollers 12 journaled to fixtures 13 which are supported on decking 14. The belt is driven from right to left by suitable mechanism, not shown. The moisture recording apparatus includes an angle iron frame 15 fixed to the decking 14 and extending over the belt spaced above the maximum upper level of material M. The frame has a central longitudinal bar 16 on which two vertical insulating bars 17 are bolted for vertical adjustment. The insulating bars support an elongated flat metal probe 18 constructed in accordance with my invention and hereinafter more fully described. The probe extends into the material M above the longitudinal center line of the belt in electrical contact therewith. A horizontal grounded electrode plate 19 is fixed to the decking 14 and extends beneath belt 10 spaced therebelow. Frame 15 and probe 18 are electrically connected to a capacitance bridge circuit which includes a meter 20 for recording the moisture content of the material. The connection includes a stiff conductor 21 attached to probe 18, a lead 22 attached to frame 15, an insulating terminal block 23 fixed to the frame, and a coaxial cable 24 electrically connected at one end to conductor 21 and lead 22 and at the other end to meter 20. The structure thus far described, apart from the probe, is known and not of my invention; hence no more detailed description is deemed necessary.

As best shown in FIGURES 2 and 3, probe 18 has a smoothly curved upstream edge 25 which forms a continuation of its bottom edge 26. The upper corner at the upstream end carries an integral projection 27. The downstream end 28 slants forward. The upper edge carries integral tabs 29 which are bolted to the insulating bars 17 to support the probe, or alternatively the projection 27 can be used in supporting the probe in place of one of these tabs. The entire probe is formed preferably of a polished stainless steel plate. It is relatively thin and it has sharp edges both on its body and on its tabs, as shown in FIGURE 3. The level of material on the conveyor of course varies. Variations change the amount of material in contact with the tabs 29. Hence the tab area should be as small as possible to minimize the fluctuation of the total contact area of the probe and the material. If this fluctuation exceeds one percent, erratic readings result.

In operation, the smooth edges of my probe prevent foreign bodies in the material carried on the conveyor from catching on the probe. When a piece of wire or string, for example, engages the upstream edge 25 of my probe, it may ride under this edge with the material. Otherwise the sharp edge of the probe may sever the wire or string. In either instance the material carries the foreign body away from the probe, and it does not remain to disturb the dielectric constant of the material.

While I have shown and described only a single embodiment of my invention, it is apparent that modification may arise. Therefore, I do not wish to be limited to the disclosure set forth but only by the scope of the appended claims.

I claim:

1. The combination, with a conveying means adapted to carry bulk material from a first location to a second location, which material is subject to contain foreign bodies of the nature of wire or string, and a fixed frame overlying said conveying means, of a probe comprising an elongated relatively thin metal plate, and support means on the upper edge of said plate suspending it from said frame, said plate having flat side faces lying in vertical planes parallel with the direction of travel of said conveying means, a relatively sharp bottom edge spaced over said conveying means, and a relatively sharp smoothly curved end forming a continuation of said bottom edge and directed toward said first location, whereby said plate is positioned to extend into material carried on said conveying means and to be substantially covered by the material, and said sharp edge and end prevent foreign bodies in the material from catching on the plate.

2. A combination as defined in claim 1 in which said conveying means is a belt and said belt forms a trough and said plate extends into the trough, said support means includes integral tabs extending from the upper edge of said plate, and said plate has an integral projection extending upwardly from said curved end with its edge forming a continuation thereof, said tabs and projection having relatively sharp edges directed toward said first location.

3. In a dielectric apparatus for measuring the moisture content of bulk material subject to contain foreign bodies of the nature of wire or string, which apparatus includes a frame, an electrode plate spaced beneath said frame, a capacitance bridge circuit to which said plate is connected, and means for conveying a stream of the material through the space between said frame and said plate from a first location to a second location, the combination therewith of a probe electrically connected to said circuit and comprising an elongated relatively thin metal plate, and support means on the upper edge of said second-named plate suspending it from said frame, said second-named plate having flat side faces lying in vertical planes parallel with the direction of travel of said conveying means, a relatively sharp bottom edge spaced over said conveying means, and a relatively sharp smoothly curved end forming a continuation of said bottom edge and directed toward said first location, whereby said second-named plate is positioned to extend into the material on said conveying means and to be substantially covered by the material, and said sharp edge and end prevent foreign bodies in the material from catching on the second-named plate.

4. A combination as defined in claim 3 in which said support means includes integral tabs extending from the upper edge of said second-named plate, and said second-named plate has an integral projection extending upwardly from said curved end with its edge forming a continuation thereof, said tabs and projection having relatively sharp edges directed toward said first location.

References Cited by the Examiner
UNITED STATES PATENTS

| | | | |
|---|---|---|---|
| 1,318,365 | 10/1919 | Erway | 111—85 |
| 1,803,689 | 5/1931 | Bernadt | 198—37 |
| 2,535,026 | 12/1950 | Anderson | 324—61 |
| 2,540,597 | 2/1951 | Riggs | 30—315 |
| 2,590,968 | 4/1952 | Hill | 198—37 X |
| 2,607,830 | 8/1952 | Razek | 324—61 |
| 3,149,650 | 9/1964 | Horst | 324—61 |

WALTER L. CARLSON, *Primary Examiner.*

J. P. O'BRIEN, C. A. S. HAMRICK,
W. H. BUCKLER, *Assistant Examiners.*